(12) United States Patent
Poustis

(10) Patent No.: US 6,481,631 B1
(45) Date of Patent: Nov. 19, 2002

(54) SUBSTRATE PROVIDED WITH AN ELECTRONIC DEVICE

(75) Inventor: Joël Poustis, Pessac (FR)

(73) Assignee: Smurfit Worldwide Research-Europe, Talence (FR)

( * ) Notice: Subject to any disclaimer, the term of this patent is extended or adjusted under 35 U.S.C. 154(b) by 0 days.

(21) Appl. No.: 09/581,177

(22) PCT Filed: Dec. 3, 1998

(86) PCT No.: PCT/FR98/02611
§ 371 (c)(1),
(2), (4) Date: Sep. 25, 2000

(87) PCT Pub. No.: WO99/31626
PCT Pub. Date: Jun. 24, 1999

(30) Foreign Application Priority Data

Dec. 17, 1997 (FR) .............................. 97 15995

(51) Int. Cl.$^7$ .............................. G06K 19/02
(52) U.S. Cl. .............. 235/488; 235/379; 235/382; 235/492; 340/572
(58) Field of Search ............... 235/492, 382, 235/379, 488; 340/572

(56) References Cited

U.S. PATENT DOCUMENTS

| | | | | |
|---|---|---|---|---|
| 4,417,413 A | * | 11/1983 | Hoppe et al. ................. | 40/630 |
| 4,617,216 A | * | 10/1986 | Haghiri-Tehrani et al. .... | 428/67 |
| 5,505,200 A | * | 4/1996 | Takaki ......................... | 128/640 |
| 5,528,222 A | * | 6/1996 | Moskowitz et al. ......... | 340/572 |
| 5,566,441 A | * | 10/1996 | Marsh et al. ................. | 29/600 |
| 5,995,006 A | * | 11/1999 | Walsh ......................... | 340/572 |
| 6,031,459 A | * | 2/2000 | Lake ........................ | 340/572.8 |
| 6,098,889 A | * | 8/2000 | Ogawa et al. .............. | 235/492 |

* cited by examiner

Primary Examiner—Karl D. Frech
Assistant Examiner—Seung Ho Lee
(74) Attorney, Agent, or Firm—Oblon, Spivak, McClelland, Maier & Neustadt, P.C.

(57) ABSTRACT

A substrate provided with at least part of a system for the non-contact identification of articles, including at least one electronic device which includes an electromagnetic-wave transmission and reception device coupled with an electronic module making it possible to process received signals and to retransmit other signals. The substrate is based on cellulose fibers and the electronic device is inserted into the substrate. A process for manufacturing such a substrate is also disclosed.

17 Claims, 6 Drawing Sheets

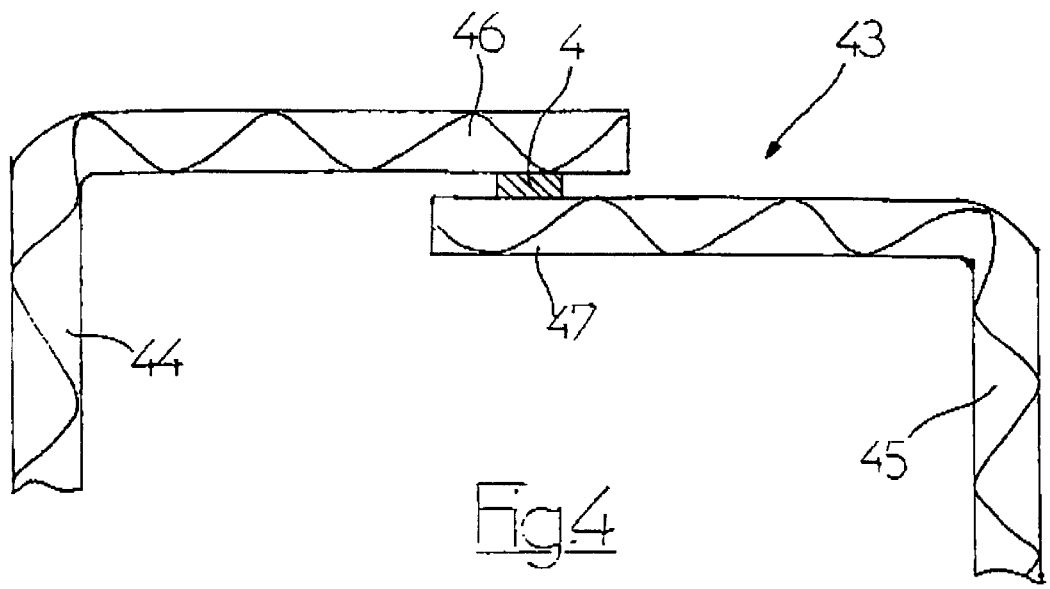
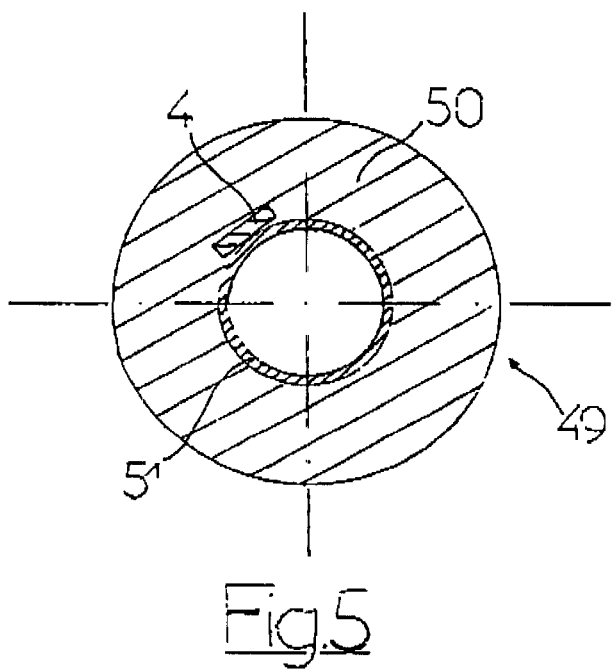

SUBSTRATE PROVIDED WITH AN ELECTRONIC DEVICE

BACKGROUND OF THE INVENTION

1. Field of the Invention

The present invention relates to a substrate provided with part of a system for the non-contact identification of articles.

2. Discussion of the Invention

In order to locate and identify articles, it is known to associate them with electronic devices called "electronic tags".

Such a tag is provided with an electromagnetic-wave transmission and reception device coupled with an electronic module making it possible to process received signals and to retransmit other signals, especially including a message for identifying the tag, and therefore the article with which it is associated. Moreover, the system includes a reader comprising an electromagnetic-wave transmission/reception device so as to transmit the information between a data terminal and the said electronic tag.

The reader fulfils several functions and especially serves to:

- transmit to the tag the energy needed for its operation, the tag having no specific autonomous energy source;
- transmit data from the terminal to the tag, this data being, where appropriate, able to be written into a memory with which the tag is provided;
- receive data from the tag and specific to the latter, in particular for the purpose of identifying it.

Until quite recently, it was satisfactory in most applications, for which an electronic tag of the abovementioned type was designed, to be able to read simultaneously a limited number (less than 10) tags in the interrogation field.

Furthermore, the intended applications were the control of access to an area, the monitoring of the access by persons or baggage to an area, the counting of articles, especially for stock management, in a plant or industrial area or else the recognition of passing objects, such as, for example, cars at a motorway tollbooth.

To meet particular applications, in which a large number of tags have to be read reliably, simultaneously and quickly, and data transmission must be possible either tag by tag or for the entire set of tags, improvements to the said tags have been made.

Such an improvement is described, for example, in French Patents FR 2,741,978, FR 2,741,979 and FR 2,741,980. By virtue of this improvement, it is possible from now on to meet the aforementioned requirements for a lower cost, the set of tags possibly being spread out within a large volume, of the order of several m$^3$.

Thus, for example, the monitoring, accounting and/or verification of articles purchased by a customer in a department store are now possible. The management of a storage area or of transport logistics is also possible.

Moreover, this functional improvement to electronic tags, which allows them to be tailored to very particular applications, has advantageously been accompanied by a dimensional improvement.

This is because some tags have been miniaturized significantly so that from now on they have a thickness of less than one millimetre for a maximum width of about two centimetres.

Such miniaturization obviously poses a problem of how to fasten a tag of the abovementioned type to the article that can be located and/or identified by means of such a tag.

SUMMARY OF THE INVENTION

The objective of the invention is therefore to solve the problem posed and especially to propose a novel way of packaging an electronic device having the characteristics of the abovementioned electronic tag, which can be easily fastened to an article, whatever the shape and purpose of the latter.

This objective is achieved by virtue of a substrate provided with at least part of a system for the non-contact identification of articles, comprising at least one electronic device which includes an electromagnetic-wave transmission and reception device coupled with an electronic module making it possible to process received signals and to retransmit other signals, characterized in that it is based on cellulose fibers and in that the electronic device is inserted into the said substrate.

The expression "inserted into the substrate" should be understood to mean here, and in the rest of the text, introduced into the substrate so as to be incorporated therein.

Thus, depending on the various shapes of the substrate based on cellulose fibers, the electronic device may, within the scope of the invention, either be embedded in the substrate, that is to say held within its thickness, or be inserted inside it.

Apart from the fact that the solution according to the invention solves the problem posed perfectly, it extremely advantageously provides a substrate which can be entirely and easily recycled.

Moreover, the electromagnetic waves transmitted and received by the electronic device are in no way disturbed by the substrate according to the invention, whatever their operating frequency range.

The combination of the electronic device and of the cellulose substrate according to the invention may constitute in itself both a product and a way of packaging the electronic device. Owing to the nature of the substrate, this may be easily incorporated, linked to any article that it is desired to tag and/or locate.

This packaging may be regarded both as a means of carrying the electronic device and of protecting the latter.

Advantageously, the electromagnetic-wave transmission and reception device according to the invention furthermore comprises an antenna, preferably of the type including a coil.

Such a configuration allows great flexibility in the choice of interrogation station or frameway that can be used as data reader and as a transmitter for sending data to the electronic device according to the invention.

Thus, depending on the given orientations of the coil in the latter, the interrogation station may include a uniaxial, biaxial or triaxial inductor.

According to a first embodiment of the substrate according to the invention, the cellulose fibers of the substrate are in the form of at least one layer in which the electronic device is embedded.

Very advantageously, the specific volume of the layer is between 1 and 10 cm$^3$/g.

It should be pointed out that within the context of the invention, the term "specific volume" should be understood to mean the ratio of the thickness of the layer to its grammage.

By falling within such a range, the electronic device is not only inserted into the layer according to the invention but, in addition, is made invisible to the naked eye.

What is more, when it is completely embedded in the layer, that is to say none of its faces emerges from the layer, the electronic device according to the invention is even better protected mechanically. In other words, its durability is correspondingly increased.

According to this same embodiment, the layer may have several forms. Firstly, it may comprise at least one sheet of paper or of board.

It may also comprise a mat of moulded cellulose. Finally, it may comprise a flat board having at least two sheets.

According to a second embodiment, the substrate according to the invention comprises at least one solid board. This may comprise two sheets of paper pasted together and between which the electronic device is inserted. It may also comprise a sheet of cellulose fibers which is wound up on itself and inside which the said electronic device is inserted. This solid board may, for example, be rolled up in the form of a tube.

According to a third, preferred embodiment, the substrate according to the invention comprises at least one corrugated board having at least one flute and at least one double-face liner, which are pasted together and between which the electronic device is inserted.

According to an additional characteristic, the substrate based on cellulose fibers has an overall stiffness of at least 5 mN.m.

This is because the stiffness is the degree of resistance offered by the substrate based on cellulose fibres when it is bent under specific conditions. In particular, when the substrate according to the invention is in the form of a board, the stiffness is one of the important characteristics as regards the use made of the said board.

Thus, giving the substrate based on cellulose fibres a minimum stiffness as defined above amounts to guaranteeing, assuredly, the "physical" integrity of the electronic device when this same substrate is subjected to particular stresses specific to the intended final application, which stresses may, for example, be associated with stacking if the substrate according to the invention, made of board, is a package in the form of a box or a case.

The invention also relates to a package comprising a substrate as defined above. This package may be parallelepipedal and/or have one or more curved walls or be of any other shape substantially matching the shape of the packaged product.

In particular, it may be a package made of corrugated board obtained according to the process described in French Patent Application FR 97/05558 filed on May 6, 1997.

Finally, the subject of the invention is a process for obtaining a substrate provided with at least part of a system for the non-contact identification of articles, comprising at least one electronic device which includes an electromagnetic-wave transmission and reception device coupled with an electronic module making it possible to process received signals and to retransmit other signals, in which process the following steps are carried out concomitantly:

a) a substrate based on cellulose fibres is manufactured;

b) the said electronic device is inserted into the substrate.

Such a process is highly advantageous from the industrial standpoint since it requires no special industrial adaptation.

This is because the step of inserting the electronic device according to the invention is carried out continuously and is entirely incorporated into existing processes for manufacturing substrates based on cellulose fibres, whether they are essentially in the form of paper or of board.

In order to carry out the insertion step, several methods of implementation may be envisaged depending on the final shape that it is desired to give the substrate.

According to a first method of implementation, the insertion is carried out in the wet end of a paper or board machine.

According to this same method of implementation, the insertion may alternatively be envisaged.

in a liquid stock of cellulose fibres, in a zone in which the moisture content is between 80 and 95%;

during the marriage of two liquid plies of cellulose fibres, preferably in a zone in which the moisture content is between 50 and 70%;

into a sheet of cellulose fibres when the latter is being wound up on itself, preferably in a zone in which the moisture content is between 5 and 10%.

According to other methods of implementation, it is also possible to insert the electronic device between two sheets so as to produce a "sandwich".

Thus, the insertion between two sheets of paper may be carried out immediately before they are pasted together, preferably in a zone in which the moisture content is between 5 and 10%.

In addition, when it is desired to obtain a corrugated board, the insertion between a single-face ply having a flute and a double-face liner may be carried out immediately before they are pasted together.

Finally, when it is desired to obtain a case made of corrugated board, the insertion between two sheets of corrugated board may be carried out in a zone in which two parts of a case tab are consolidated.

The invention is capable of numerous and varied applications. It may be used for tagging and/or locating articles such as books, clothes, records, food products, industrial products, electronic equipment, rolls or mandrels for supporting sheet, etc.

It may also be used for identifying goods and services, such as credit cards, telephone cards or tickets for road, sea or air transport.

It may also be used in techniques for detecting the counterfeiting of articles, more particularly luxury articles, such as clothes, etc.

Finally, it may be used in techniques for communicating, by transmission, information contained in the electronic device according to the invention to display screens, for example for advertising purposes.

BRIEF DESCRIPTION OF THE DRAWINGS

Further details and advantageous characteristics of the invention will emerge below on reading non-limiting illustrative examples, with reference to the figures which show:

FIG. 4: a sectional view of part of a packaging case made of corrugated board according to the invention;

FIG. 5: a sectional view of a tube made of solid board according to the invention.

DESCRIPTION OF THE PREFERRED EMBODIMENT

First of all, it should be pointed out that, for the sake of clarity, the figures are extremely schematic and do not respect the relative proportions between the various elements.

It should also be pointed out that the electronic device 4 of each of the figures, described in all the illustrative examples below, essentially has the same characteristics as the electronic tag described in the aforementioned French Patent FR 2,741,978 and that its operation is similar to that described in the aforementioned French Patents FR 2,741,979 and FR 2,741,980.

In particular, the integrated electromagnetic-wave transmission and reception device comprises an antenna which itself includes a coil.

Finally, it should be pointed out that this same electronic device 4 can be in the form of a circular piece having a diameter of a few millimetres to a few centimetres and having a thickness of between 50 and 550 micrometers.

Figure 1:
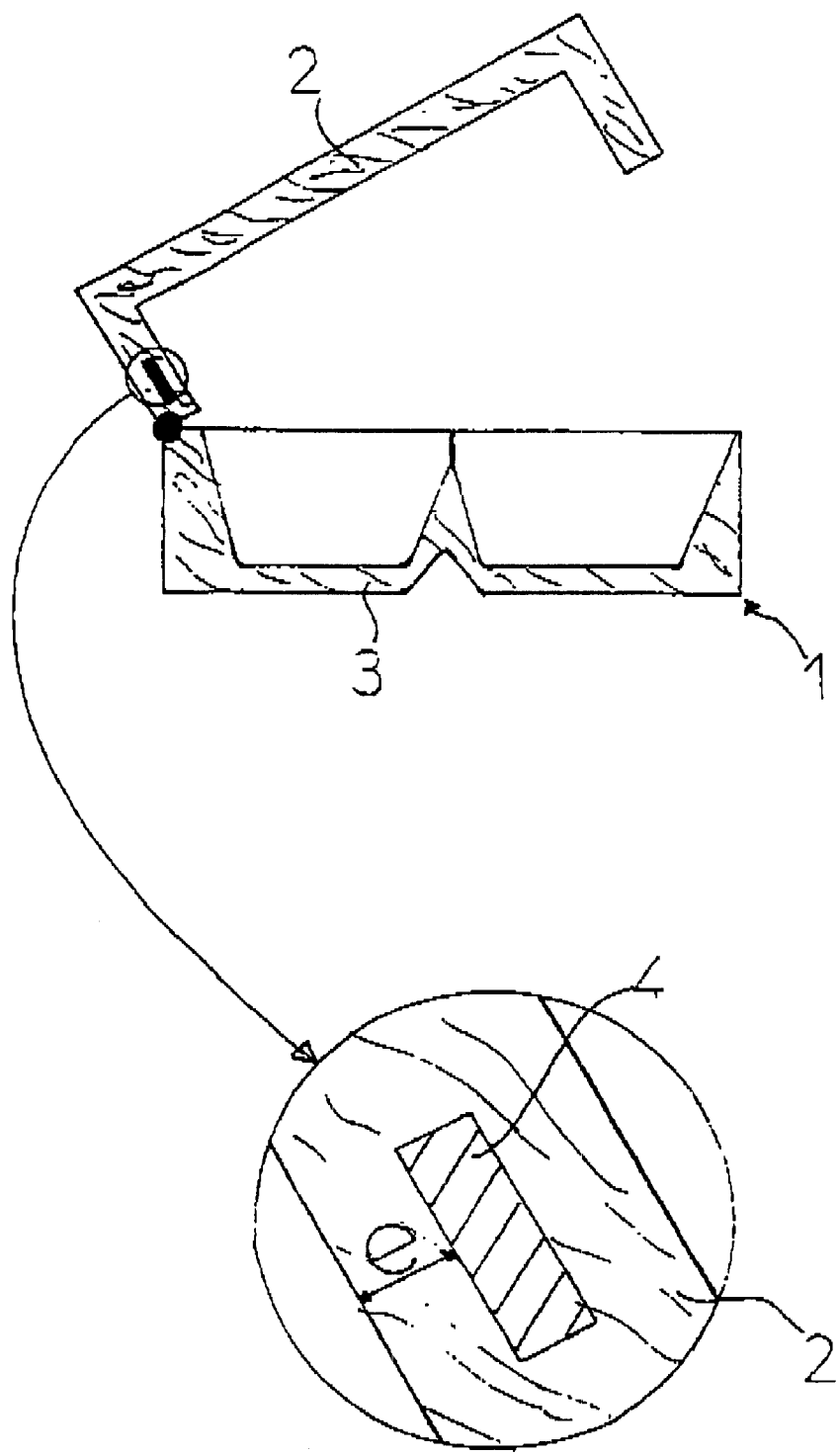
FIG. 1: a sectional view of a packaging box made of moulded cellulose according to the invention.

Reference will firstly be made to FIG. 1. This is a sectional view of a packaging box 1 made of moulded cellulose, having a lid 2 and a bottom 3.

This bottom 3 is intended to serve as wedging, for transporting various and varied electronic appliances (portable telephones, etc.).

Embedded in the Lid 2 is an electronic device 4 which is therefore made invisible to the naked eye.

The function of this electronic device 4 is to locate and identify electronic equipment housed in the box 1 and contains a certain number of information items, such as the total price, the date of manufacture and the reference numbers of these appliances.

In order to insert this electronic device 4 into the box 1, the procedure is as follows:

- a liquid stock is prepared in a conventional manner by suspending virgin or recycled cellulose plant fibres in a liquid vehicle, preferably in the form of water;
- the said stock is poured into a mould of shape complementary to the box 1 while allowing the liquid vehicle to flow away until the moisture content reaches 80 to 95%;
- once this moisture content is reached, the electronic device 4 is positioned in the stock;
- finally, the assembly thus formed is pressed in a press, the said press having a shape matching that of the mould.

The force exerted by the press is set so that the specific volume of the cellulose mat is about 2 cm$^3$/g.

Under these conditions, all the faces of the electronic device 4 are covered with a thickness e of at least 50 micrometers of the mat described above.

Of course, this thickness e depends on the nature of the plant fibres used and on their final density once the package has dried, the density being directly proportional to the force exerted by the press.

A person skilled in the art should adapt, as desired, these parameters according to the intended final application.

Figure 2A:
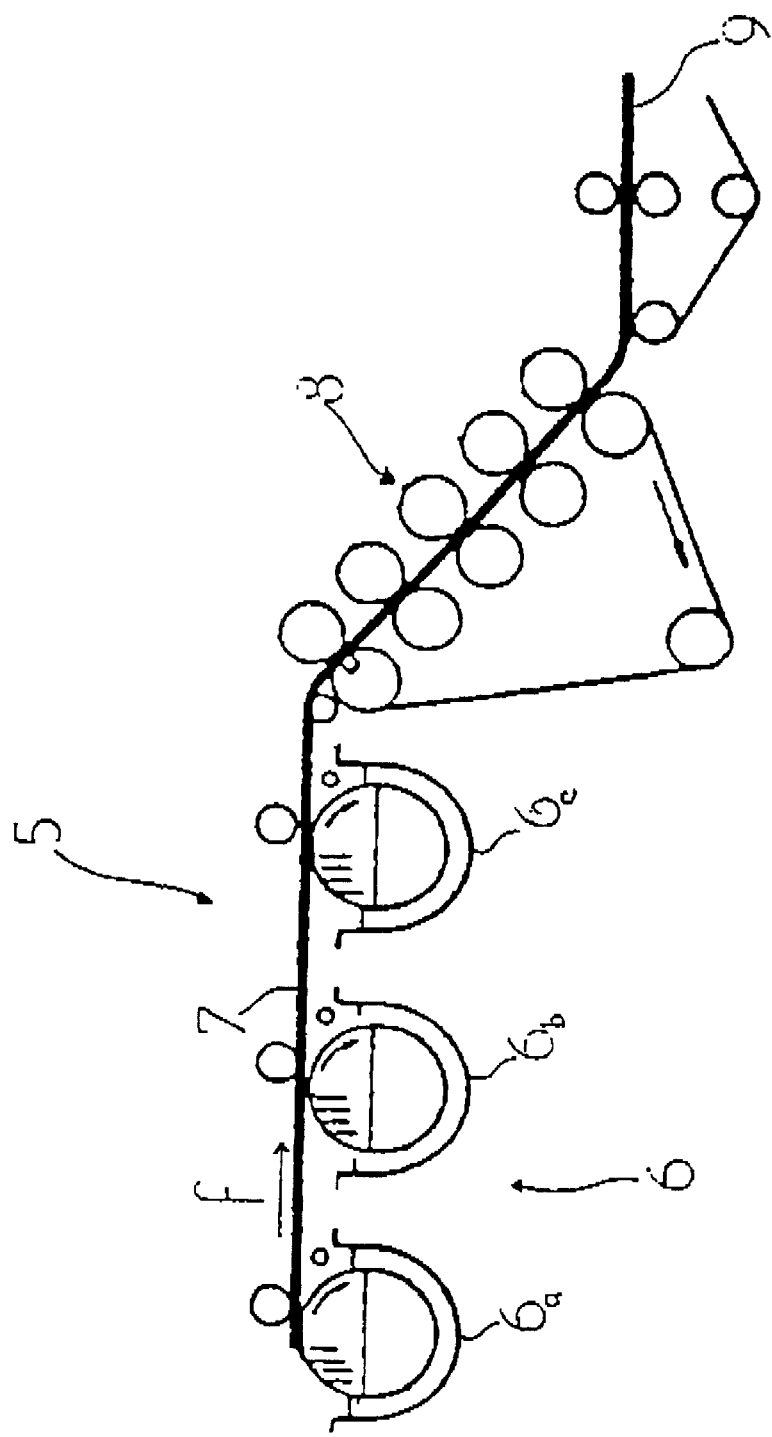
FIGS. 2a, 2b, 2c: a general side view of an apparatus for manufacturing a flat board according to the invention, a side view of part of the same apparatus and a perspective view of a flat board obtained using this apparatus.
Figure 2B:
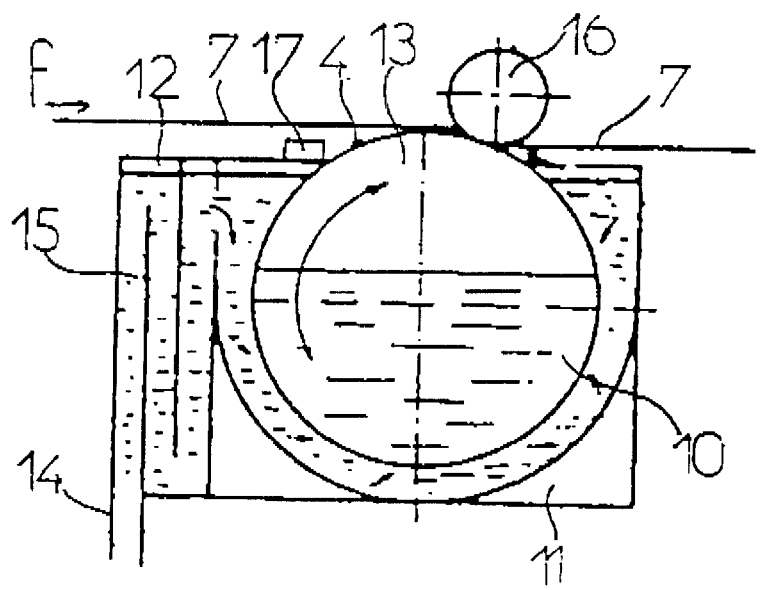
Figure 2C:
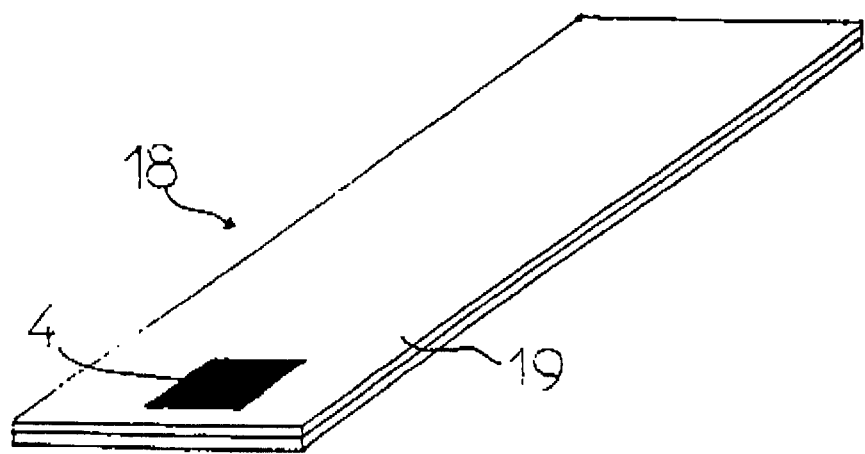

Reference will now be made to FIGS. 2a, 2b and 2c relating to a flat board according to the invention.

FIG. 2a is a general side view of part of an apparatus for manufacturing a flat board according to the invention.

The manufacturing apparatus 5 furthermore includes three autonomous devices 6 (6a, 6b, 6c) aligned one after the other.

The function of each of these autonomous devices 6 is to lay down a liquid ply formed from a stock of cellulose fibres, as will be described below, on a conveyor support 7, called a pick-up felt, the direction of movement of which is indicated by the arrow f in FIG. 2a.

Downstream of these autonomous devices 6 and once the liquid plies have mutually interpenetrated, the conveyor support 7 passes through a set of dewatering presses 8 which assembles the plies in a definitive manner into the form of sheets, which sheets in turn form the flat board 9.

Of course, in order to complete the manufacture of this flat board 9, the manufacturing apparatus 5 also includes, downstream, devices known per se such as a press and a drying section.

Let us now return to the autonomous devices 6 for forming a Liquid ply.

FIG. 2b is a side view of the device 6b.

This essentially comprises a cylinder mould 10 rotating in a tank 11 surmounted by a base 12. This base 12 allows only a fraction 13 of the cylinder mould 10 to emerge.

As regards the tank 11, this communicates with a pipe 14 via which the liquid stock of cellulose fibres 15 arrives.

A press roll 16, called lift press, presses the conveyor support 7 against the emergent fraction 13 of the cylinder mould 10.

Finally, a dispenser 17 for dispensing the electronic devices 4 is fastened to the base 12 in the immediate vicinity of the front part of the aforementioned fraction 13.

The operation of this apparatus is as follows: the rotating cylinder mould 10 continuously takes up a uniform amount of the liquid stock 13 of cellulose fibres in the form of a ply having a thickness proportional to the speed of rotation of the cylinder mould 10.

The dispenser 17 deposits an electronic device 4 on this ply.

Upon contact with the press roll 16, the electronic device 4 is embedded during interpenetration of the ply with the conveyor support 7 below which there is another liquid ply coming from the formation device 6a located upstream, in a zone in which the moisture content is between 50 and 70%.

The frequency at which the dispenser deposits electronic devices 4 on the cylinder mould 10 is defined according to the use and therefore, in addition, according to the desired final dimensions of the flat board.

This deposition may be carried out, for example, at regular intervals and its actuation may be slaved to a detector which detects the presence of the electronic device 4 in the flat board. The detector is positioned, for example, well downstream of the manufacturing apparatus 5.

Be that as it may, all these controls are within the competence of a person skilled in the art and it will be possible for him to make his choices according to the desired properties, specific to the use of the flat-board product, such as the stiffness, printability and machineability.

FIG. 2c shows a perspective view of an underground ticket 18 made of flat board 19 obtained using the apparatus that has just been described.

Compared with existing tickets, this no longer has a magnetic stripe and it is identified by means of the inserted electronic device 4.

Figure 3A:
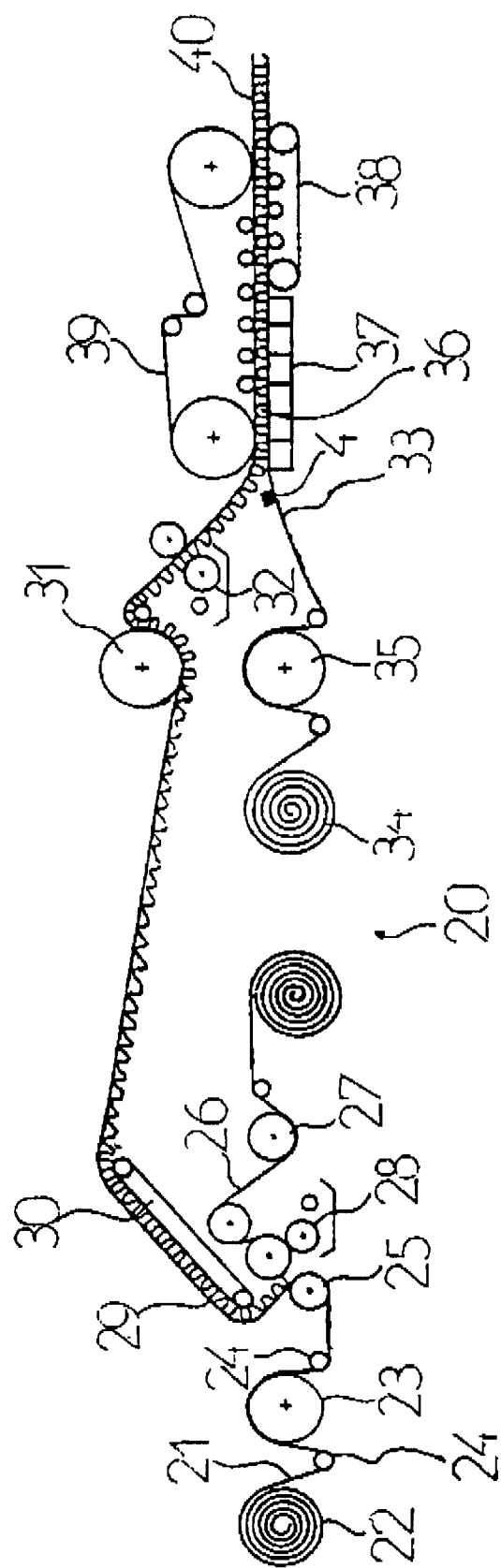
FIGS. 3a, 3b, 3c: a general side view of part of an apparatus for manufacturing a double-face corrugated board according to the invention, a perspective view of this same board cut into a sheet and, finally, a perspective view of a packaging case made of corrugated board obtained from this sheet.

FIG. 3a shows part of an apparatus for manufacturing a double-face corrugated board.

In this manufacturing apparatus 20, a single-face liner 21, having a grammage of 150 g/cm$^2$, coming from a reel 22, passes around a preheating cylinder 23 while being maintained under tension by the tensioning rolls 24.

After having passed around an assembly roll 25, the liner is joined with a flute 26, having a grammage of 120 g/cm$^2$ and preheated by passing around a preheating cylinder 27. It is then sized using a sizing device 28. The single-face ply 29 thus formed is driven, inter alia, by a belt 30 to a preheating cylinder 31 and then to a second sizing device 32 before being joined with the double-face liner 33. This double-face liner, having a grammage of 200 g/cm$^2$, coming from a reel 34 passes around a preheating cylinder 35 and is then joined to the single-face ply 29.

An automatic device (not shown) positions an electronic device on the double-face liner 33 immediately before it is joined to the single-face ply 29.

The double-face ply 36 thus formed then passes between several heating tables 37 located upstream of a tensioning belt 38 and an upper belt 39 so as to exert sufficient pressure on the said ply 36 and to form a double-face corrugated board 40.

Figure 3B:
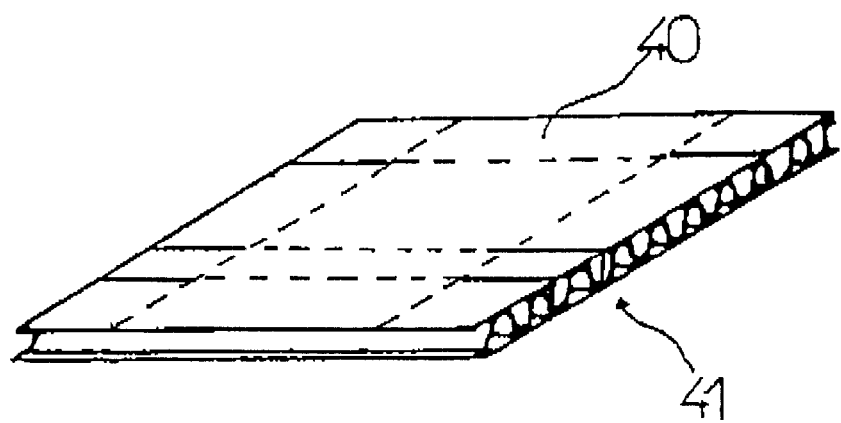

FIG. 3b shows a sheet 41 cut from the double-face corrugated board 40 obtained according to the foregoing process.

Figure 3C:
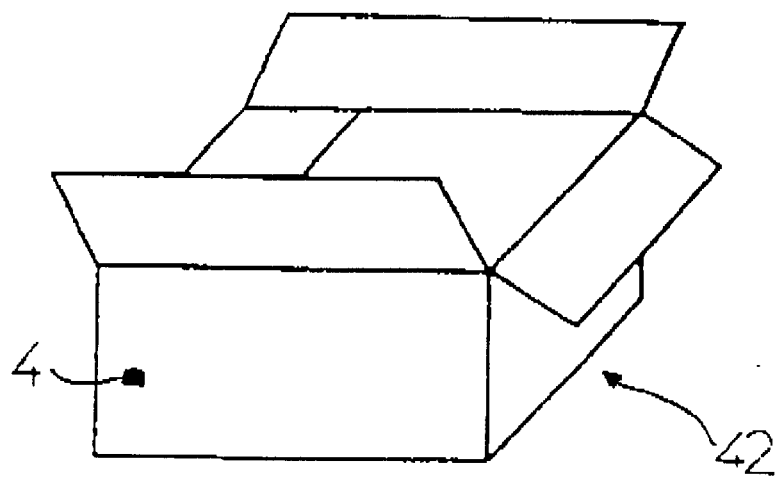

This sheet 41 is in turn prescored along the cutting lines shown by continuous Lines and is then folded, along the dotted lines, so as to obtain the packaging case 42 shown in FIG. 3c.

This packaging case is then ready for packaging various products which can be tagged and/or located using the inserted device 4.

FIG. 4 is a sectional view of part of a packaging case 43 made of corrugated board, in accordance with the aforementioned case except that the electronic device 4 is inserted between two corrugated-board sheets 44, 45, the ends 46, 47 of which constitute the two respective parts of the same tab of the case.

In order to carry out the insertion, a conversion machine of the folder-gluer type known per se is used. Once the two ends 46, 47 have been folded, the electronic device is placed at their interface before the assembly is stapled so as to form the tab.

FIG. 5 shows a sectional view of a tube 49 made of solid board.

Here, the electronic device 4 is placed at the interface of two sheets of paper 50, 51 which form the tube 49.

This tube 49 may serve as a mandrel for supporting reels of paper or as packaging tubes for cylindrical containers of the bottle type.

In order to carry out the insertion, a first sheet of paper 50 is wound here on a roll and then, while pasting a second sheet of paper 51 to the first sheet 50, the electronic device 4 is placed at their interface in a zone in which the moisture content of each of the two sheets 50, 51 is between 5 and 8%.

The pasting is carried out using an amylaceous paste. This may also be a vinyl or a starch-based paste.

It should be noted that whatever the method of implementing the invention described above, the insertion of the electronic device 4 is carried out without special adaptation of the latter.

Furthermore, the device mechanically withstands the temperature, moisture and pressure conditions encountered in the various manufacturing apparatuses described.

Of course, various detail modifications may be made by a person skilled in the art without thereby departing from the scope of the invention, insofar as, once the electronic device has been inserted into the substrate based on cellulose fibres, its integrity and its reliability are guaranteed.

What is claimed is:

1. A substrate including at least part of an electronic device for non-contact identification of articles, comprising:
at least one sheet of cellulosic fibers-based material, wherein the electronic device is inserted between two adjacent layers of the cellulosic fibers-based material without indenting the two layers of the cellulosic fibers-based material and without forming a cavity between the two layers of the cellulosic fibers-based material, and the substrate has an overall rigidity of at least 5 mN.m.

2. A substrate according to claim 1, wherein the electronic device includes an electromagnetic-wave transmission and reception device and an antenna.

3. A substrate according to claim 1, wherein a volume of each of the two layers is between 1 and 10 cm$^3$/g.

4. A substrate according to claim 1, wherein the at least one sheet comprises at least one sheet of paper or at least one sheet of board.

5. A substrate according to claim 1, wherein the two layers each comprise a mat of molded cellulose.

6. A substrate according to claim 1, wherein the at least one sheet comprises a flat board having at least two sheets.

7. A substrate according to claim 1, wherein the at least one sheet comprises at least one solid board having two sheets of paper pasted together and between which the electronic device is inserted or a sheet of cellulosic fibers wound on itself and inside which the electronic device is inserted.

8. A substrate according to claim 1, wherein the at least one sheet comprises at least one corrugated board having at least one flute and at least one double-face liner, which are pasted together and between which the electronic device is inserted.

9. A package comprising a substrate according to claim 1.

10. A process for forming a substrate including at least part of an electronic device for non-contact identification of articles, comprising:
forming at least one sheet of cellulosic fibers-based material,
inserting the electronic device between two adjacent layers of the cellulosic fibers-based material without indenting the two layers of the cellulosic fibers-based material and without forming a cavity between the two layers of the cellulosic fibers-based material, and the substrate to have an overall rigidity of at least 5 mN.m.

11. A process according to claim 10, wherein the inserting step is carried out in a wet end of a paper or board machine.

12. A process according to claim 11, wherein the inserting step is carried out when a predetermined moisture content of the at least one sheet is between 80 and 95%.

13. A process according to claim 11, wherein the inserting step is carried out during a marriage of two liquid plies of cellulosic fibers, when a predetermined moisture content is between 50 and 70%.

14. A process according to claim 10, wherein the inserting step is carried out when the cellulosic fibers are being wound up on themselves, and the predetermined moisture content is between 5 and 10%.

15. A process according to claim 10, wherein the inserting step is carried out between two sheets of paper immediately before they are pasted together, when the predetermined moisture content is between 5 and 10%.

16. A process according to claim 10, wherein the inserting step is carried out between a single-face ply having a flute and a double-face liner immediately before they are pasted together.

17. A process according to claim 10, wherein the inserting step is carried out between two sheets of corrugated board in a zone in which two parts of a case tab are consolidated.

* * * * *